United States Patent [19]
Carpenter

[11] Patent Number: 5,497,577
[45] Date of Patent: Mar. 12, 1996

[54] ARTIFICIAL STEM, SUPPORT, AND FLORAL PICK DEVICE

[76] Inventor: Michael K. Carpenter, 2510 Panama Mall, Philadelphia, Pa. 19103

[21] Appl. No.: 401,267

[22] Filed: Mar. 9, 1995

[51] Int. Cl.$^6$ .............................. A01G 5/00; A47G 7/00
[52] U.S. Cl. ..................................... 47/41.12; 47/41.15
[58] Field of Search ............................ 47/41.15, 41.12, 47/41.01

[56] References Cited

U.S. PATENT DOCUMENTS

| | | | |
|---|---|---|---|
| 2,366,377 | 1/1945 | Zois | 47/41.12 |
| 2,486,848 | 11/1949 | Huck | 47/41.15 |
| 2,904,932 | 9/1959 | Seewann | 47/41.15 |

FOREIGN PATENT DOCUMENTS

| | | | |
|---|---|---|---|
| 2373258 | 8/1978 | France | 47/41.12 |
| 1778554 | 5/1968 | Germany | 47/41.12 |
| 213393 | 2/1941 | Switzerland | 47/41.12 |

*Primary Examiner*—Henry E. Raduazo
*Assistant Examiner*—Joanne C. Downs

[57] ABSTRACT

An apparatus used to lengthen or replace a natural stem while allowing for a solid insertion (picking) into floral arrangements. Embodiments of this present invention include a cylindrical rod of absorbent floral foam, acting as the water translocating core of a natural stem. This core is to have a water impermeable, exterior coating (shell) and uncoated ends, the nature of which may be a clear plastic resin providing rigidity and moisture retention. This exterior shell will have a surface area of evenly spaced perforations, these being of sufficient size and number, allowing the air transfer, necessary for the wetting and wicking action of the core. A recessed or dimpled top end will provide for ease of stem insertion, while a bottom end slant cut will facilitate base medium placement. The embodiment of this invention can be modified and economically fabricated by dual extrusion or injection molding. Although natural in appearance, this device may be color shaded and decoratively enhanced. Heretofore, use of this invention will expand creativity, ameliorate the problems of stem length, perishability, damage, and the cost of large commercial arrangements.

1 Claim, 1 Drawing Sheet

ARTIFICIAL STEM, SUPPORT, AND FLORAL PICK DEVICE

BACKGROUND

1. Field of Invention

This invention is an improvement, relating to Floriculture, as pertains to the florist industry. The primary object being an artificial stem device for the lengthening, strengthening and nurturing of flower stems, in a natural, damaged, or cut short state. Secondary objectives include combining this vehicle for the transmission of water with a means of mounting and arranging. Tertiary objectives include using this device as a means for dry mounting or transport of these flowers.

2. Description of Prior Art

In the Florist Industry there are very specific limitations, the most serious being varietal versatility, cost, and perishability. Very often stem length, along with woody, weak, clustered or damaged stems, will impede usability. The sheer cost of long stem orders adds unnecessary exclusivity. These limitations exacerbate the task of designer creativity and customer satisfaction. The more versatile the flower, the more it is used. Short natural stems will simply not lend themselves to large arrangements. Clustered heads, which should be a bonus, are stripped to a single head. Damaged, unruly, or weak stems are disposed of rather than used. The accrued value of these castaways is considerable. Consequently, the retailer, knowing the liability of unusable stock, relies heavily on all purpose standards. These facts lead to conservative buying on both sides of the counter, and contribute to a design repetition that is inevitably stultifying to long term customers.

These concerns are compounded by perishability during transport. The time spent, in dry transportation of woody stemmed varieties, is critically important to the longevity of their bloom. Soft stemmed varieties are frequent victims to the rubber banding of bunches. These circumstances of increased risk, along with neglected cut flower purchases, often make revivification impossible. The solution to these problems would be welcomed by the floral business at large.

Gallo U.S. Pat. No. 4,106,234 Aug. 15, 1978, Gallo U.S. Pat. No. 5,099,604 Mar. 31, 1992 (FIG. 5), and Gallo U.S. Patent application Ser. No. 07/294,165 1989, are among the few that address the invention of an artificial stem device. These transmit water from a remote source to the flower head, via an open-ended tube with an inserted piece of absorbent material. The unit of absorbent material is then affixed or glued, within the tube, to avoid displacement during flower stem insertion. These inventions require a certain amount of tedious fabrication. Each employs water absorption mediums that have relatively inefficient draw and retention capacities. Conduits of flocked or chenille wire, cotton, sponges, and blotter paper are not state of the art flow conductors. They lack the proper density to retain sufficient amounts of water beyond the forces of gravity and the drying action of air. These are best suited for short term applications only.

Other patent issues that allow for water transmission, albeit not from a remote source, are Wollen U.S. Pat. No. 3,928,936 Dec. 30, 1975, and Gallo U.S. Pat. No. 5,099,604 Mar. 31, 1992 (FIGS. 1, 2, 3, 4, 6, & 7). These are for the most part centered around the insertion of natural stems in limited self-contained water reservoirs (chambers), used mostly for dry mount applications. They employ much the same, in small amounts, of inefficient water absorbing materials. However, Wollen does allude to the possible use of other absorbent materials and broadly states, "absorbent means contained within said chamber."

Floral foam, now in the public domain, remains the state of the art absorption medium. In all cases it is used only for the base medium retention of water. The above Patent issues disregard its ability for the remote transmission of same.

There are capped tube accessories, also in the public domain, and large enough to be filled exclusively with water. However, their bulk makes them unwieldy and extremely difficult to camouflage, which makes them poor candidates for stem extension. In the case of funeral arrangements they are difficult to bunch and cost prohibitive, for the quantities needed. Subsequently, flowers are dry picked into a moistureless base medium (Styrofoam) and wilt rapidly. Only the hardiest varieties are used for this purpose, eliminating a vast selection of current choices. This designation renders them remotely unappealing and unsalable for other occasions.

One patent issue for an improved artificial stem speaks well of current antiquated methods, Craig U.S. Pat. No. 0,144,446 Nov. 11, 1873, uses no absorbent material and wire only. This is very similar to the methods used in the fabrication of dry mounted wearables in 1995.

Another requirement indigenous to the aforementioned Gallo patents, and artificial stem issues, Thomas U.S. Pat. No. 2,331,440 Oct. 12, 1943, Gallo U.S. Pat. No. 3,150,462 Sep. 29, 1964, and Gallo U.S. Pat. No. 3,553,889 January 1971, is the necessity of impaling flower heads on the various wire components that are the spines of these artificial stems. This method, for the purpose of affixing the flower, decreases the water absorption potential of the natural stem. It displaces critical cells within the stem wall, exposes the same to increased withering, and runs the risk of splitting the flower. Preservation of cut flowers requires the least possible damage to an already disrupted organism, rendering this method intrusive at best.

Floral picks are devices used to facilitate the insertion of a natural stem into a base medium, for the purpose of arranging. They are essentially made of wood, metal, or plastic with a means of strapping or holding the flower stem. This reinforces and lengthens the stem. Simply, it may provide the stem with a pointed end. Examples of which are Kamrass U.S. Pat. No. 1,990,407 Feb. 5, 1935, Reichelt U.S. Pat. No. 2,249,567 Jul. 15, 1941, Brutocao U.S. Pat. No. 2,486,109 Oct. 25, 1949, and Gallo U.S. Pat. No. 3,474,568. They are essentially similar in nature, and employ no means of water transmission or retention. These have proven to be useful tools for dry applications of limited time, or in wet mediums, when stems are long enough to need only strengthening. Large water tube accessories can be adapted as picks, with the addition of a pointed bottom or wooden extensions. While they may work for some applications, they still pose the problems of concealment previously noted.

Flower head support devices such as those in Court U.S. Pat. No. 5,060,417 Oct. 29, 1991, and Ahmed U.S. Pat. No. 5,293,713 Mar. 15, 1994 are meant to combat the serious problem of delayed flower head wilt. They are used to eliminate the tedious wiring of rose heads, a potentially injurious rectification process. The dry transportation of flowers can cause stem air entrapment resulting in head droop. This usually occurs after initial revivification. This is especially true of roses based in floral foam mediums and frequently true in water only applications. The two inventions mentioned above do not address the already serious condition of the blossom. Its life span has been compromised. Ignoring this may be feasible for short term applications. It is however, potentially disastrous for the period of maximum bloom. Theoretically the application of head supports prior to arranging may facilitate in the removal of air blockage, which may be well applied in situations where natural long stems are a requirement. Although, for most arrangements that inadvertently conceal stems, this is a time consuming and costly resolve. In closing there is the added issue of concealing the apparatus itself, previously noted, and applying here as well.

SUMMARY OF THE INVENTION

Objects and Advantages

It is the principal objective of this invention to improve upon and obviate the several aforementioned objections to aspects of preceding artificial stem devices. The embodiment of this invention is also an improved joining of additional concepts. There is a serious need for workable methods of increased preservation and usage of all cut flower varieties.

Primarily, this current invention addresses the need for a device that will allow for the efficient transmission of water, from a base medium source, to the flower head, thereby eliminating natural stem problems, and positively affecting maximum bloom potential in a floral arrangement. This is achieved by the use of a simple floral foam rod with, a clear, water impermeable, surface coating (shell), exposed (uncoated) ends, and exterior perforations. The foam core will, with proven ability, draw and retain copious amounts of water. This core will also, by its structural nature, firmly grip the stem and secure its placement. The clear coating (shell) will effect rigidity and moisture conservation. The uncoated ends will allow for the contiguous transmission of water, a means of easy flower stem insertion, and a bottom treatment to be discussed in secondary objectives. Perforations will assist in the air exchange necessary for the continuous wicking action of the foam core. To become operative, this device is simply pre-moistened, and the prepared (recut) flower stem inserted. It is then ready for placement in an arrangement.

It will further allow for the use, extension, and repair of stems. This operation requires only the removal of the offending stem section before application. Short natural stems are immediately lengthened by the placement of this device. Multiple stems and clustered heads need only be divided and recut before insertion into the pre-moistened device.

It will further ensure the elimination of head droop, peculiar to woody stemmed varieties, in situations where natural long stems are not a requirement, examples of which are most floral foam based arrangements. This allows for the removal of the air blocked stem, ideally up to the first leaf node. This removal and application of the device directly, in this case roses, to the hip will ensure continuous fluid intake and the upright position of the blossom.

It will further allow for a concealed natural stem like appearance. Designed in an unobtrusive manner, this device, by virtue of the moistened core, will take on a mottled green hue, thus becoming self-concealable and blending naturally in all applications.

It will further provide for increased retail profit margins and low manufacturing costs in the fabrication of this device. It uses the same inexpensive and effortless dual extrusion process, known to makers of core filled snack foods, effectively creating a single unit, and negating the possibility of core shifting during stem insertion. If required, it will easily lend itself to a variety of dimensions, color shading and decorative enhancement. This device may avail itself of a recessed top opening for the easy and deep placement of flower stems, and the following objectives.

A secondary objective of the embodiment of this current invention is the joining of this water transmissible device with the means of a secure anchoring, in all base mediums. This is achieved by the addition of a slant cut made at the bottom of the device, this slant cut being of a sufficient angle to ensure a pointed or pick end. This pick end will allow for easy insertion, and eliminate the possibility of air entrapment at the bottom of the device. This end cut may be made by the manufacturer, or as a height adjustment by the florist.

It will further lend itself to short term dry based (Styrofoam) uses. Because of its slim nature and water retention ability it exerts little pressure on the force of gravity. After excess water run off, this device can be considered a quasi-reservoir. This will allow for a safe, effective, and improved use in applications such as funeral arrangements, garlands and the like.

A tertiary objective of the embodiment of this current invention is the use of this device for dry and transportable applications. This is achieved by drawing off or crimping one end of the device during the, previously mentioned, dual extrusion process. Alternatively, this device may be injection molded, to accommodate a range of finished ends. These are further suited for the ideal application of stem end capping, ensuring wilt prevention, in transport. This includes flowers that are bunched or boxed in customer transport or wholesale distribution. As mentioned previously, there are tube accessories in the public domain that can be applied to this purpose. However, use of the modified current invention for this purpose would be cost effective, market expanding, and in that sense novel.

DETAILED DESCRIPTION OF A PREFERRED EMBODIMENT

Figure 1:
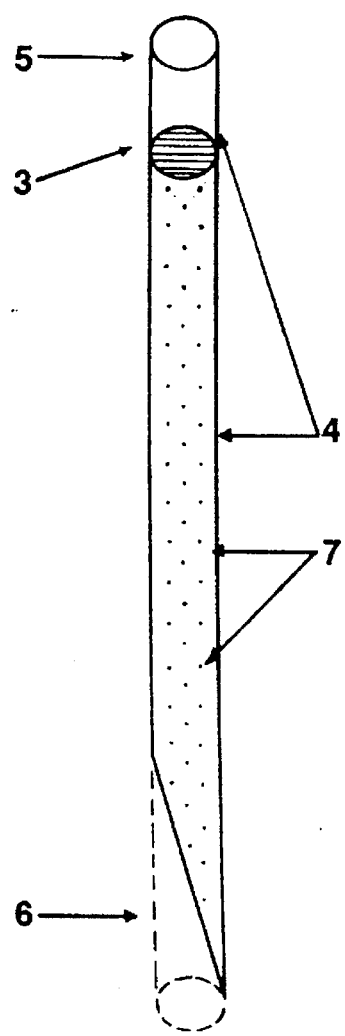
FIG. 1 is a perspective view of a device according to a preferred embodiment of the present invention.
Figure 2:
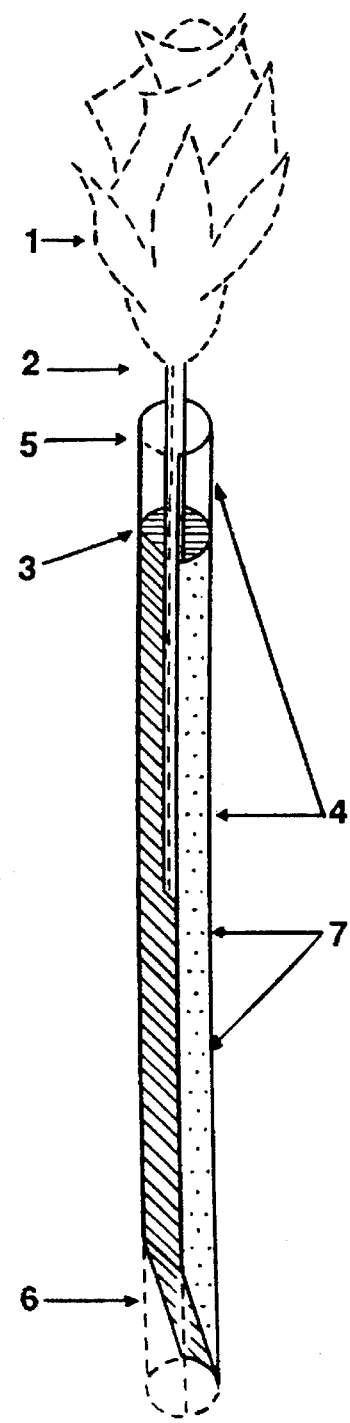
FIG. 2 is a perspective view in partial cross section of the device (shown in FIG. 1) now operative, with a flower stem fully inserted.

FIGS. 1 & 2 show the artificial stem, support, and pick device according to a preferred embodiment of the present invention in full perspective and partial cross section view. The reference numerals are consistent for all drawings.

FIG. 1 shows a floral foam rod (core) (3) with a clear, water impermeable, surface coating (shell) (4), an exposed (uncoated), recessed or dimpled top (5), an exposed (uncoated), slant cut bottom (pick) (6), and evenly spaced, exterior perforations (7). The interior foam core (3) may be of an optional density floral foam for the purpose of water transmission to, and gripping of, the inserted flower stem. The clear, water impermeable coating (shell) (4) may be of a plastic polymer resin, of sufficient thickness, to effect moisture conservation, and rigidity requirements. The recessed or dimpled top (5) will facilitate in the easy and deep placement of a flower stem. The slant cut (6) is of a sufficient angle to facilitate base medium insertion, greater water absorption, and the avoidance of air entrapment at the bottom of the device. This slant cut (6) may be made by the manufacturer, or as a height adjustment by the florist. The exterior perforations (7) are of sufficient size to allow the air exchange, necessary for the wetting and wicking action of the foam core. These actions ready the device (FIG. 1), for use.

FIG. 2 shows a flower (1) and prepared (recut) stem (2), inserted deeply into a floral foam rod (core) (3) with a clear, water impermeable, surface coating (shell) (4), an exposed (uncoated), recessed or dimpled top (5), an exposed (uncoated), slant cut bottom (pick) (6), and evenly spaced, exterior perforations (7). With premoistening, and the insertion of a prepared (recut) stem (2), the device (FIG. 1 & 2) is now in operation.

FIGS. 1 & 2 show a device that should be used for the problem areas of, short, weak, damaged, woody and unruly stems. This device (FIG. 1 & 2) can be applied to the division of multiple or clustered stems, and flower head wilt. This device (FIG. 1 & 2) will lend itself to a firm anchoring in wet (floral foam) or, after excess run off, dry (Styrofoam) based arrangements. The creation of this device (FIG. 1 & 2) may be achieved by a dual extrusion process, or by injection molding that will simultaneously effect a single unit. This will avoid displacement of the foam core (3), after flower stem (2) insertion. The dimensions of this device (FIG. 1 & 2) should vary to accommodate the desired height, width of stems, and stem support of a floral arrangement. Modifications of this device may include color shading and various bottom treatments.

The invention having been described, what is claimed is:

1. An artificial stem device as a means for the lengthening and support of flower stems comprising:

a core rod of water absorbent floral foam through which water is transmitted to a stem, and into which said stem is inserted, a water impermeable outer shell created with said core rod so that said shell and said core rod commence as a single unit, a series of perforations through an exterior surface of said outer shell providing a means of air transfer for wetting and wicking of said core rod, a top end of said unit being open and said rod core thereby exposed, said rod core further being recessed from said top end for ease of insertion of said stem, and a bottom end opening of said unit being diagonally cut and leaving said core rod exposed, said diagonal cut facilitating the insertion of said unit into floral arrangements.

* * * * *